US005570958A

United States Patent [19]

Tsukada

[11] Patent Number: 5,570,958
[45] Date of Patent: Nov. 5, 1996

[54] MINIATURE LINEAR GUIDE LUBRICATED WITH A LUBRICANT CONTAINING POLYMER

[75] Inventor: Toru Tsukada, Gunma, Japan

[73] Assignee: NSK Ltd., Tokyo, Japan

[21] Appl. No.: 312,969

[22] Filed: Sep. 30, 1994

[30]    Foreign Application Priority Data

Sep. 30, 1993   [JP]   Japan .................................. 5-244850

[51] Int. Cl.[6] ............................. F16C 29/06; F16C 33/10
[52] U.S. Cl. ............................. 384/45; 384/13; 384/902
[58] Field of Search ............................. 384/13, 43–45, 384/902, 907, 279

[56]             References Cited

U.S. PATENT DOCUMENTS

| 3,022,542 | 2/1962  | Davis ............................ 384/902 X |
| 3,027,626 | 4/1962  | Murphy et al. ................... 29/148.4 |
| 4,239,632 | 12/1980 | Baile ............................ 252/12 |
| 4,421,363 | 12/1983 | Olschewski et al. .............. 384/13 |
| 4,797,011 | 1/1989  | Saeki et al. .................... 384/13 |
| 4,892,415 | 1/1990  | Katahira ........................ 384/45 |
| 5,066,145 | 11/1991 | Sibley et al. ................... 384/13 X |

FOREIGN PATENT DOCUMENTS

| 3012018  | 10/1981 | Germany . |
| 63-23239 | 5/1988  | Japan . |

*Primary Examiner*—Thomas R. Hannon
*Attorney, Agent, or Firm*—Sughrue, Mion, Zinn, Macpeak & Seas

[57]             ABSTRACT

A miniature linear guide provides a guide rail and a slider that is fitted inside the guide rail in an axially slidable manner via a number of balls and that is an integral assembly of a slider body and a circulator that is fitted in the concave portion of the slider body and which has internal, axially extending unloaded ball circulating paths. Since a lubricant-containing polymer member is provided between the unloaded ball circulating paths in such a way that it contacts the balls, the lubricant oozes slowly out of the polymer member to be supplied automatically to the surfaces of the balls over an extended period so as to assure long life for the miniature linear guide.

2 Claims, 4 Drawing Sheets

MINIATURE LINEAR GUIDE LUBRICATED WITH A LUBRICANT CONTAINING POLYMER

BACKGROUND OF THE INVENTION

The present invention relates to a convenient-type miniature linear guide. More particularly, the present invention relates to a miniature linear guide of a type that is lubricated with a lubricant-containing polymer and which enables the lubricant to be supplied automatically for a prolonged period to a number of balls that rotate in a circulatory mode along grooves in a slider and that are components of the miniature linear guide.

An example of a conventional miniature linear guide is shown in FIGS. 5 and 6. The basic components of the miniature linear guide are an axially extending guide rail 1 substantially U-shaped in cross section and a slider 2 which is fitted in the guide rail 1 so that it is capable of sliding along the guide rail. The slider 2 is an integral assembly of a slider body 3, a circulator 4, and a holding plate 5. The slider body 3 is formed by pressing a plate material into a substantially U-shape in section. The circulator 4 is made by molding plastics in such a shape that it includes a ball circulating path formed therein. The circulator 4 and the holding plate 5 are fitted in a concave portion of the slider body 3, with the holding plate 5 being held between the slider body 3 and the circulator 4.

The inner surfaces of two side walls of the guide rail 1 are provided with axial loaded ball rolling grooves 1B whereas the outer surfaces of the respective side walls of the slider body 3 are provided with axial loaded ball rolling grooves 3B which are confronted with the grooves 1B. A number of balls 6 are incorporated in the grooves 1B and 3B, as well as in the ball circulating path in the circulator 4. The miniature linear guide shown in FIGS. 5 and 6 is so adapted that when the slider 2 is linearly moved along the guide rail 1, the balls 6 rollingly rotate in an endless circulating manner. The inside of the slider 2 is filled with a lubricant such as grease or lube oil for lubricating the rolling balls 6.

To insure that the balls move smoothly for an extended time, periodic refilling of the lubricant is necessary. However, with the miniature linear guide which is small in size and which hence requires a compact design, it is difficult to provide a lubricant refill port (e.g., a grease nipple) which is normally used with the standard linear guide. This has caused the disadvantage that periodic refilling of the lubricant is impossible without disassembling the miniature linear guide.

Another problem with the conventional miniature linear guide is that its small size prevents the provision of a completely sealed design and that, therefore, even if the miniature linear guide is filled with a lubricant to full capacity, the lubricant splashes outside the miniature linear guide during operation and cannot be retained for an intended long period, whereby the life of the miniature linear guide ends prematurely.

The conventional miniature linear guide has another problem in that a lubricant reservoir cannot be provided within the miniature linear guide, without blocking the circulation of balls because the size of the miniature linear guide is too small.

SUMMARY OF THE INVENTION

The present invention has been accomplished under these circumstances and has as an object providing a long-lived miniature linear guide that uses a lubricant-containing polymer, thereby assuring that the lubricant can automatically be supplied for an extended period.

This object of the present invention can be attained by a miniature linear guide that provides: a guide rail U-shaped in section, which is extended axially, the guide rail including a first loaded ball rolling groove formed on an inner surface of a side wall of the guide rail and extended axially; a slider including a slider body, U-shaped in section which is adapted to be fitted in the guide rail in which the slider body includes a second loaded ball rolling groove formed on an outer surface of a side wall of the slider body and confronted with the first loaded ball rolling groove of the guide rail, and a circulator having an unloaded ball circulating path which is extended axially, the circulator being fitted in the slider body, and a plurality of balls fitted to roll in a space defined by the first and second loaded ball rolling grooves and the unloaded ball circulating path of the circulator; and a lubricant-containing polymer member installed in the circulator in contact with the balls.

In a preferred embodiment, the lubricant-containing polymer member is held between two split halves of the circulator.

In another embodiment, the lubricant-containing polymer member is embedded in a solid mass of the circulator.

According to the present invention, the lubricant-containing polymer member provided in the circulator having the ball circulating paths permits the lubricant to ooze out slowly so that it is supplied automatically and uniformly to the surfaces of the balls it makes contact with.

The polymer member serves as a lubricant reservoir itself. The lubricant contained in the polymer member oozes out to its surface by various actions including capillarity, as well as the pressure and heat generation due to the rolling of the balls, and this effectively prevents the lubricant from splashing outside the guide.

Because of these features, the miniature linear guide of the present invention has an extended life in that it is capable of performing consistent lubrication over a prolonged time without periodic refilling of the lubricant.

The miniature linear guide has the additional advantage that without potential contamination of its exterior by the fine particles of the lubricant, it can be used within clean rooms.

DETAILED DESCRIPTION OF THE PREFERRED EMBODIMENTS

Embodiments of the present invention are described below with reference to FIGS. 1 to 4, in which the parts or components which are the same as those in the conventional miniature linear guide are identified by like numerals.

Figure 1:
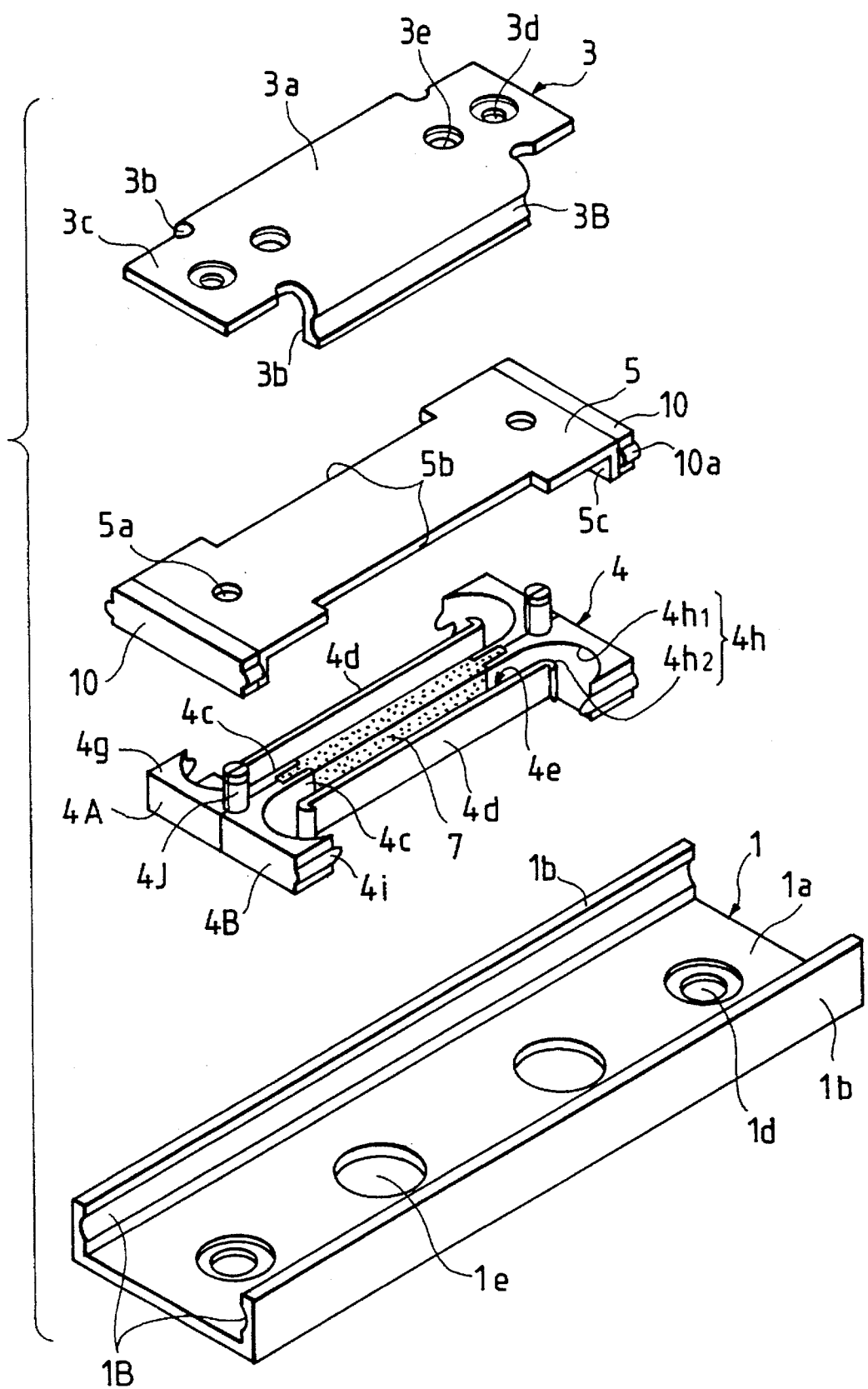
FIG. 1 is a perspective view showing an example of the miniature linear guide of the present invention in an unassembled state.
Figure 2:
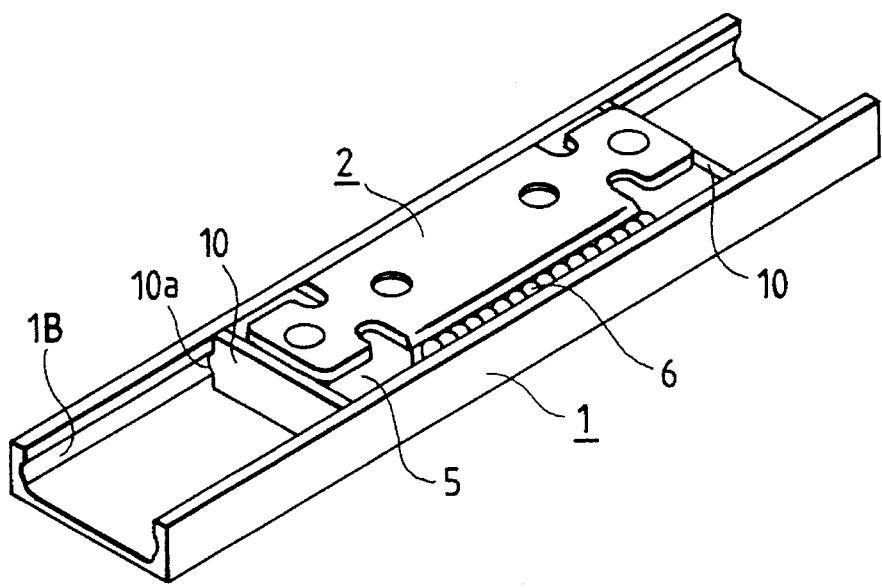
FIG. 2 is a perspective view showing the general appearance of the miniature linear guide as constructed by assembling the components shown in FIG. 1.

To begin with, the overall structure of a linear guide according to a first embodiment of the present invention is described. FIG. 1 is a perspective view of the miniature linear guide in an unassembled state, and FIG. 2 is a perspective view showing the general appearance of the miniature linear guide as it has been assembled.

Referring to FIG. 1, a guide rail 1 for guiding a slider 2 is made from a steel plate by pressing into a generally U-shape in cross section and it consists of a bottom plate $1a$ and two side walls $1b$ which are the guide planes formed by bending upward the lateral edges of the bottom plate $1a$. An axially extending loaded ball rolling groove 1B is formed on the inner surface of each side wall $1b$. The loaded ball rolling grooves 1B formed in the inner surfaces of the two side walls $1b$ are parallel to each other and have a cross section that resembles a Gothic arch (or which is generally semicircular). The bottom plate $1a$ is provided not only with countersunk holes $1d$ through which bolts are to be inserted for mounting the guide rail 1 on other components of the miniature linear guide but also with holes $1e$ for measuring the precision of mounting.

The slider 2 is composed of a slider body 3 formed of a thin steel plate, a circulator 4 formed of a synthetic resin, and a holding plate 5 also formed of a thin steel plate.

The slider body 3 has an outer width slightly greater than the inner width of the guide rail 1, or the distance between the inner surfaces of the two side walls $1b$, and it consists of a top plate $3a$ and two side walls $3b$ which are formed by bending down the lateral edges of the top plate $3a$. Having a substantially U-shape in cross section, the slider body 3 is placed between the side walls $1b$ of the guide rail 1. Axially extending loaded ball rolling grooves 3B are formed in the outer surfaces of the side walls $3b$ confronted with the loaded ball rolling grooves 1B of the guide rail 1. Like grooves 1B, the loaded ball rolling grooves 3B each have a cross section resembling a Gothic arch (or being substantially semicircular). The top plate $3a$ has wings $3c$ at opposite ends in the longitudinal direction that project beyond the axial length of the side walls $3b$, and each wing $3c$ has a countersunk hole $3d$ for assisting in the engagement of the slider body 3 with the circulator 4. Formed inward of the holes $3d$ are holes $3e$ through which screws are to be inserted for mounting a table and other components on the slider 2.

In the first embodiment, the circulator 4 is of a split type that is formed by joining together two members 4A and 4B that have been injection molded in symmetrical shapes with respect to the center line.

The walls $4c$ of the two members 4A and 4B are to be joined together in a back-to-back relationship to form the center portion. It should, however, be noted that the wall $4c$ of the first member 4A closely contacts the wall $4c$ of the second member 4B only at the end portions and the greater part of the intermediate areas are formed in a sufficiently small thickness so that they face each other with a certain clearance being provided. As shown, each wall $4c$ has an axially extending cutout $4k$ in its upper portion. A wall $4d$ parallel to each wall $4c$ is erected, with an axially extending unloaded ball rolling groove $4e$ being interposed between the two walls $4c$ and $4d$. Because of this arrangement, the two members 4A and 4B, when joined together, form a body portion that provides a substantially E-shape as seen from above. The body portion has a flange $4g$ that projects beyond each end in the axial direction and which has a semicircular groove $4h$ that communicates with the unloaded ball circulating groove $4e$. The unloaded ball circulating groove $4e$ and the semicircular groove $4h$ at either end thereof combine to constitute an unloaded ball circulating path. As shown in FIG. 1, the semicircular groove $4h$ consists of an outer arcuate face $4h1$ and an inner arcuate face $4h2$ which is formed at either end of the wall $4d$ in the axial direction in correspondence to the outer arcuate face $4h1$, thereby assuring that balls can be smoothly guided along the groove $4h$. The open end of the curved groove $4h$ (which communicates with the loaded ball rolling groove 1B of the guide rail 1) coincides with the lateral end of the flange $4g$, where a ball scoop $4i$ projects in such a way that it is capable of engagement with the loaded ball rolling groove 1B, thereby assuring that balls are circulated smoothly during the operation of the miniature linear guide. Cylindrical engagement projections $4j$ are erected on top of the flanges $4g$ of the circulator 4; one semicylindrical half is formed at either end of the first member 4A whereas the other semicylindrical half is formed at either end of the second member 4B, and the two halves are joined together into a complete cylinder.

Figure 3:
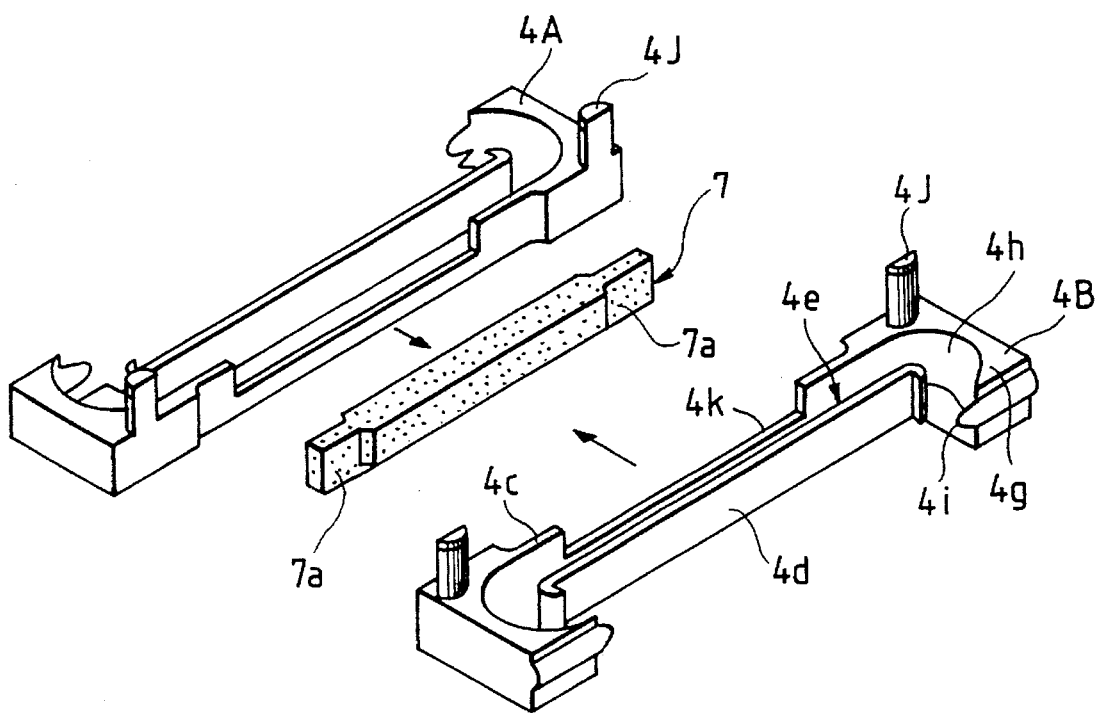
FIG. 3 is a perspective view showing an embodiment of the present invention as it relates to the mounting structure of the lubricant-containing polymer member.

In the first embodiment under consideration, the circulator 4 is formed by joining the two members 4A and 4B in a back-to-back relationship, with a lubricant-containing polymer member 7 being held between the members 4A and 4B. As shown in FIG. 3, the lubricant-containing polymer member 7 is a substantially rectangular plate with either end being made thinner than the other area so as to form holding portions $7a$; the other area which corresponds to cutouts $4k$ in the walls $4c$ of the circulator members 4A and 4B is formed as a thick-walled portion. If the holding portions $7a$ at opposite ends are tightly held between the walls $4c$ of the members 4A and 4B, the thick-walled portion of the polymer member 7 is fitted in the cutouts $4k$ and retained there in such a way as to become part of the walls $4c$ as shown in FIG. 1.

Details of the lubricant-containing polymer member 7 will be given hereinafter. The lubricant-containing polymer member to be used with the linear guide of the present invention is formed by a process providing the following steps: mixing a polymer selected from the group of α-olefinic polymers having basically the same chemical structure (e.g., polyethylene, polypropylene, polybutylene and polymethylpentene) with a lubricant suitably selected from among paraffinic hydrocarbon oils (e.g., poly-α-olefin oil), naphthenic hydrocarbon oils, mineral oils, ether oils such as dialkyldiphenyl ether oils, ester oils such as phthalate-trimellitate esters, etc.; heating the mixture to melt; injecting the melt into a given mold; and cooling the molding to solidify under pressure. If desired, various additives such as antioxidants, rust inhibitors, anti-wear agents, antifoaming agents, extreme pressure agents, etc., may be added preliminarily.

The α-olefinic polymers listed above have basically the same chemical structure but different average molecular weights ranging from $1 \times 10^3$ to $5 \times 10^6$. Preferably, those polymers having comparatively low molecular weights with average values of $1 \times 10^3$ to $1 \times 10^2$ and those having super-high molecular weights with average values of $1 \times 10^6$ to $5 \times 10^6$ may be used either alone or in admixtures as required.

In order to enhance the mechanical strength of the lubricant-containing polymer member of the present invention, the α-olefinic polymers listed above may be mixed with appropriate thermoplastic and thermosetting resins. Exemplary thermoplastic resins that can be used include polyamides, polycarbonates, polybutylene terephthalate, polyphenylene sulfide, polyethersulfone, polyetherether ketone, polyamideimide, polystyrenes and ABS resins. Exemplary thermosetting resins include unsaturated polyester resins, urea resins, melamine resins, phenolic resins, polyimide resins and epoxy resins. These resins may be used either alone or in admixtures.

It is also within the scope of the present invention to add suitable compatibilizers as required in order to insure that the α-olefinic polymers listed above and other resins are dispersed in a more uniform state.

The lubricant-containing polymer member 7 to be used in the embodiment under consideration may be formed by mixing a polyethylene consisting of 14 wt % of a low-molecular weight species (average molecular weight=$1\times10^3$ to $5\times10^5$) and 6 wt % of a superhigh-molecular weight species (average molecular weight=$1\times10^6$ to $5\times10^6$) with 80 wt % of a paraffinic hydrocarbon oil as a lubricant, heating the mixture to melt, injecting the melt into a predetermined mold, and cooling the molding to solidify under pressure.

The holding plate 5 serves to hold the two members 4A and 4B of the circulator 4 together in an integrally joined state. The plate has holes 5a at both ends in the axial direction, through which the cylindrical engagement projections 4j in the flange portions 4g of the circulator 4 are to be inserted; the plate also has cutouts 5b along both lateral edges in such positions that they fit with the two side walls 3b of the slider body 3. In addition, both ends of the holding plate 5 in the axial direction are bent down to form projections 5c at right angles with respect to the major surface of the plate. The outer surface of each projection 5c is provided with a synthetic rubber molded part as a sealant (side seal) that is fixed by bonding, baking, inserting or some other suitable means.

The sealants 10 are formed in such a way that semicircular seal projections 10a that protrude into the loaded ball rolling grooves 1B of the guide rail 1 to make slidable contact with the surfaces of those grooves are provided at both end faces of their rectangular cross section in the longitudinal direction, thereby closing any clearances that may form between the guide rail 1 and the slider 2 when the latter is assembled and set in the former.

The slider 2 may be assembled by the following procedure.

The lubricant-containing polymer member 7 is held between the two members 4A and 4B, which are brought into abutment against each other in a back-to-back relationship, thereby forming the circulator 4. The cylindrical engagement projections 4j are inserted through the holes 5a in the holding plate 5 so that the plate is fitted over the circulator 4. The slider body 3 is then placed over the holding plate 5 and the circulator 4 in such a way that the engagement projections 4j on the circulator 4 are inserted through the countersunk holes 3d in the wings 3c.

Subsequently, the heads of the projections 4j protruding beyond the top of the slider body 3 are thermally compressed to fuse to the surrounding areas of the slider body 3, whereby the slider body and the circulator 4 are fixed to each other, with the holding plate 5 being interposed. The slider 2 being assembled in this way, the unloaded ball circulating grooves 4e and the curved grooves 4h in the circulator 4 are closed with the holding plate 5 and, at the same time, the inner arcuate faces 4h2 at the open ends of the curved grooves 4h connect smoothly to the loaded ball rolling grooves 3B of the slider body 3, thereby forming stepless and smooth unloaded ball circulating paths.

The assembled slider 2 is loosely fitted in the concave portion of the guide rail 1, with a number of balls being incorporated not only in the thusly formed unloaded ball circulating paths but also in the space between the loaded ball rolling grooves 1B of the guide rail 1 and the opposing loaded ball rolling grooves 3B of the slider body 3.

The outer arcuate faces 4h1 at the open ends of the curved grooves 4h are connected to the loaded ball rolling grooves 1B of the guide rail 1 in close proximity to their bottoms via the ball scoops 4i which project beyond the lateral ends of the wings 4g of the circulator 4 and this arrangement assures smooth circulation of the balls.

With the slider 2 being thus assembled and set in the guide rail 1, some clearances develop between their opposing faces on either side but this can be effectively closed by means of the sealants 10 fitted at the ends of the slider 2.

The guide in the first embodiment described above will operate in the following manner. When the slider 2 moves along the guide rail 1 bolted to a machine, balls 6 are rollingly moved along the loaded ball rolling grooves 1B and 3B in the same direction as the slider 2 but at a slower rate than the latter. When the balls 6 reach the wings 4g at one end of the circulator 4, they are scooped by the projections 4i to be guided into the curved grooves 4h, along which they make a U-turn to pass through the unloaded ball circulating grooves 4e. As they pass through the grooves 4e, the balls 6 contact the surfaces of the lubricant-containing polymer member 7 which constitute the inner surfaces of the circulator 4. The exposed surfaces of the polymer member 7 are constantly supplied with the slowly oozing lubricant, which thus adheres to the surfaces of the balls 6 that came into contact with the polymer member. The balls 6 thus having a constant fresh supply of the lubricant reach the curved grooves 4h at the other end of the circulator 4, where they make another U-turn and go back to the loaded ball rolling grooves 1B of the guide rail 1 and to the loaded ball rolling grooves 3B of the slider body 3. In this way, the balls 6 are lubricated consistently over a prolonged period and, hence, a low-torque and smooth operation of the machine can be performed for a long continuous time without any particular need for external lubricant refilling at periodic intervals.

Further, the polymer member 7 functions as a lubricant reservoir which supplies the lubricant in very small portions; hence, the splashing of the lubricant to the outside of the guide is negligible and this contributes not only to the extension of the life of the miniature linear guide but also to a significant decrease in the generation of dust particles which would otherwise contaminate clean rooms.

Figure 4:
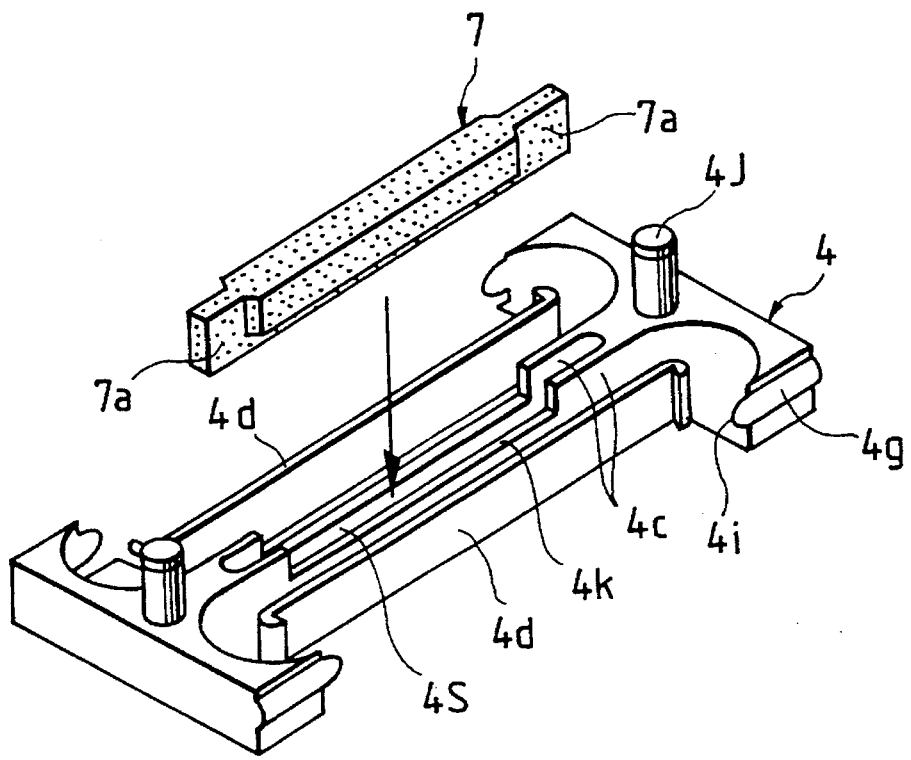
FIG. 4 is a perspective view showing another embodiment of the present invention as it relates to the mounting structure of the lubricant-containing polymer member.
Figure 5:
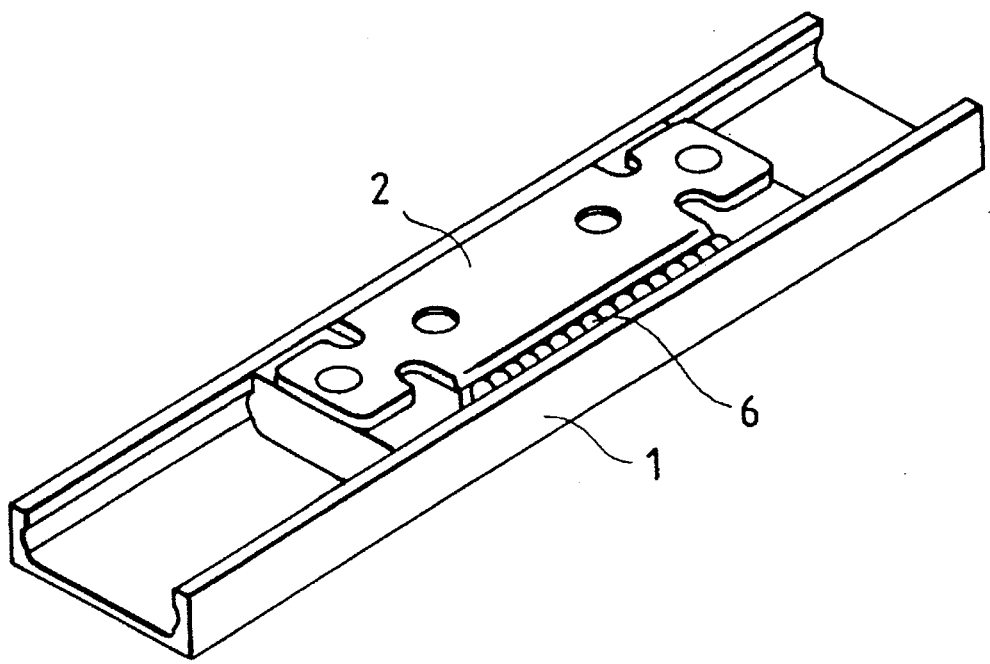
FIG. 5 is a perspective view showing the general appearance of a conventional miniature linear guide.
Figure 6:
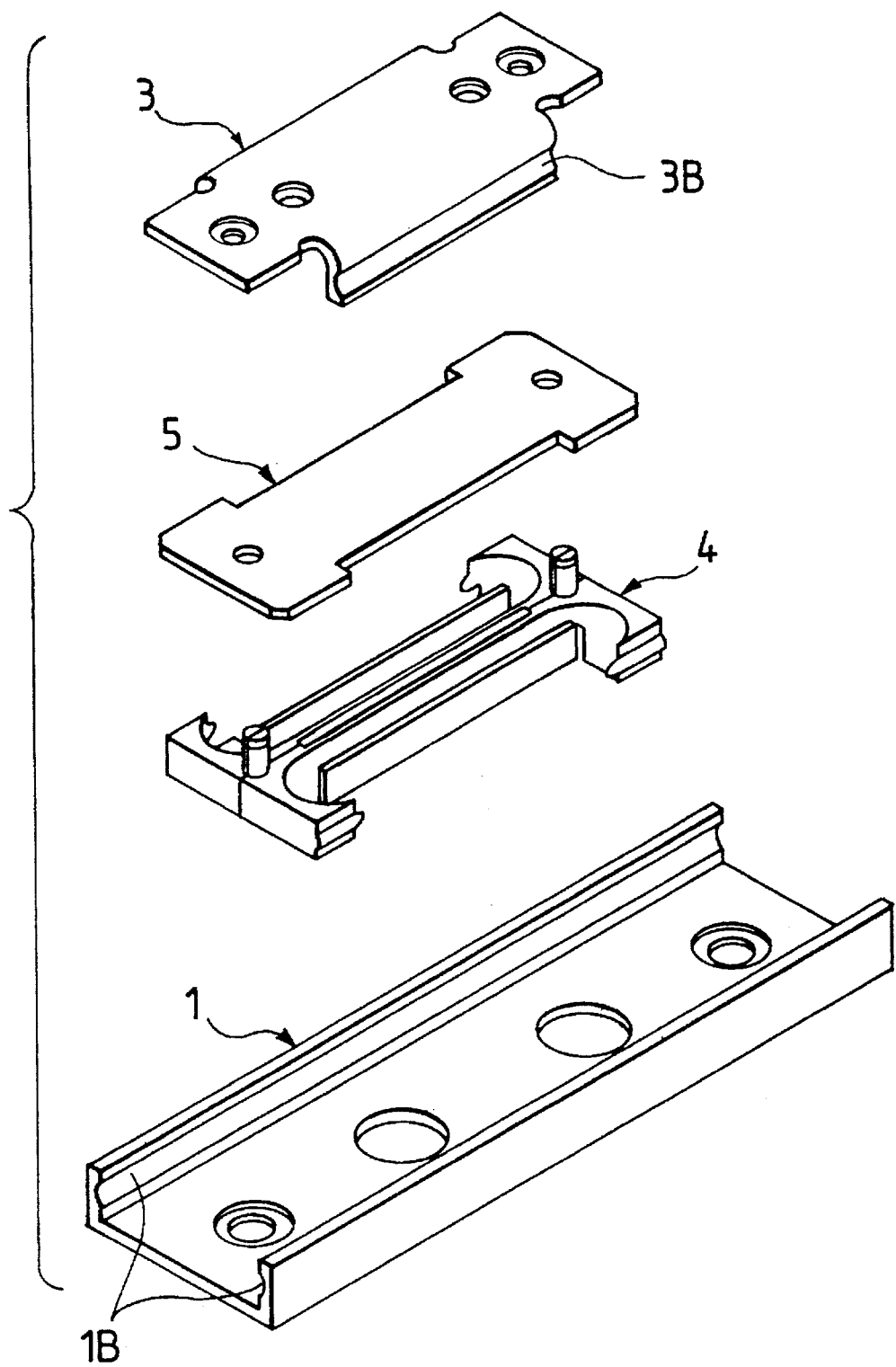
FIG. 6 is a perspective view showing the miniature linear guide of FIG. 5 in an unassembled state.

FIG. 4 illustrates another method of mounting the lubricant-containing polymer member 7. In the case shown in FIG. 4, the circulator 4 is formed of one piece, which has a groove-like clearance 4s and cutouts 4k formed in a central partition wall 4c so that a lubricant-containing polymer member 7 of the same shape as in the first embodiment is mounted by being fitted into the space defined by those portions 4s and 4k.

The lubricant-containing polymer member 7 used in the second embodiment performs the same function and brings about the same advantage as in the first embodiment.

As described on the foregoing pages, the present invention provides a miniature linear guide having a slider that is fitted inside a guide rail in an axially slidable manner via a number of balls and which is an integral assembly of a slider body and a circulator that is fitted in the concave portion of the slider body and which has internal, axially extending unloaded ball circulating paths, and this slider is lubricated by means of a lubricant-containing polymer member that is provided between the unloaded ball circulating paths in such a way that it contacts the balls. Because of this arrangement, the lubricant slowly oozes out of the polymer member to be supplied automatically to the surfaces of the rolling elements; at the same time, the polymer serving as a lubricant reservoir by itself effectively prevent the lubricant from splashing outside the guide. As a result, the miniature linear guide has a long service life in that it is capable of effective lubrication for an extended period.

What is claimed is:

1. A miniature linear guide comprising:

a guide rail that is U-shaped in section and which extends axially, said guide rail including a first loaded ball rolling groove formed on an inner surface of a side wall of said guide rail and extending axially;

a slider including:

a slider body that is U-shaped in section and which is adapted to be fitted in said guide rail, said slider body including a second loaded ball rolling groove formed on an outer surface of a side wall of said slider body and confronted with said first loaded ball rolling groove of said guide rail; and a circulator having an unloaded ball circulating path which extends axially, said circulator being fitted in said slider body; and a plurality of balls fitted to roll in a space defined by said first and second loaded ball rolling grooves and said unloaded ball circulating path of said circulator; and a lubricant-containing polymer member installed in said circulator in contact with said balls, wherein said circulator is formed by joining two half members in a back-to-back relationship, said polymer member being held between said half members.

2. A miniature linear guide comprising:

guide rail that is U-shaped in section and which extends axially, said guide rail including a first loaded ball rolling groove formed on an inner surface of a side wall of said guide rail and extending axially;

a slider including:

a slider body that is U-shaped in section and which is adapted to be fitted in said guide rail, said slider body including a second loaded ball rolling groove formed on an outer surface of a side wall of said slider body and confronted with said first loaded ball rolling groove of said guide rail; and a circulator having an unloaded ball circulating path which extends axially, said circulator being fitted in said slider body; and a plurality of balls fitted to roll in a space defined by said first and second loaded ball rolling grooves and said unloaded ball circulating path of said circulator; and a lubricant-containing polymer member installed in said circulator in contact with said balls, wherein said circulator is formed of one piece, said piece has a groove-like clearance and a cutout formed in a central partition wall of said circulator, said polymer member being fitted into a space defined by said clearance and said cutout.

* * * * *